(12) United States Patent
Klassen et al.

(10) Patent No.: US 9,285,858 B2
(45) Date of Patent: Mar. 15, 2016

(54) METHODS FOR MONITORING AND ADJUSTING PERFORMANCE OF A MOBILE COMPUTING DEVICE

(71) Applicants: BlackBerry Limited, Waterloo (CA); 2236008 ONTARIO INC., Waterloo (CA)

(72) Inventors: Gerhard Dietrich Klassen, Waterloo (CA); Etienne Belanger, Kanata (CA)

(73) Assignees: BlackBerry Limited, Waterloo (CA); 2236008 Ontario Inc., Waterloo (CA)

(*) Notice: Subject to any disclaimer, the term of this patent is extended or adjusted under 35 U.S.C. 154(b) by 367 days.

(21) Appl. No.: 13/752,695

(22) Filed: Jan. 29, 2013

(65) Prior Publication Data

US 2014/0215253 A1  Jul. 31, 2014

(51) Int. Cl.
G06F 1/32 (2006.01)

(52) U.S. Cl.
CPC .............. *G06F 1/3206* (2013.01); *G06F 1/324* (2013.01); *G06F 1/3228* (2013.01); *G06F 1/3296* (2013.01); *G06F 1/32* (2013.01)

(58) Field of Classification Search
CPC ...... G06F 1/3203; G06F 1/324; G06F 1/3296
USPC ........................................................ 713/320
See application file for complete search history.

(56) References Cited

U.S. PATENT DOCUMENTS

| | | | |
|---|---|---|---|
| 5,731,811 A * | 3/1998 | De Lange et al. .............. 345/536 |
| 7,174,468 B2 * | 2/2007 | Gary et al. ..................... 713/300 |
| 7,698,575 B2 | 4/2010 | Samson |
| 8,117,367 B2 | 2/2012 | Conti et al. |
| 8,276,015 B2 | 9/2012 | Floyd et al. |
| 8,320,898 B2 | 11/2012 | Salsbery et al. |
| 8,327,158 B2 | 12/2012 | Titiano et al. |
| 2005/0097228 A1 * | 5/2005 | Flautner et al. .................. 710/1 |
| 2005/0132238 A1 * | 6/2005 | Nanja ............................ 713/300 |
| 2005/0223249 A1 * | 10/2005 | Samson ........................ 713/320 |
| 2005/0278561 A1 * | 12/2005 | Seo ................................ 713/322 |
| 2007/0157206 A1 * | 7/2007 | Rakvic et al. ................. 718/102 |
| 2008/0079732 A1 * | 4/2008 | Park et al. ..................... 345/501 |

(Continued)

OTHER PUBLICATIONS

European Patent Office, Extended European Search Report dated Jun. 24, 2013, issued in European Patent Application No. 13153120.4-1903.

Gheorghita et al. "System-Scenario-Based Design of Dynamic Embedded Systems," ACM Transactions on Design Automation of Electronic Systems, Jan. 2009. vol. 14, No. 1. http://dl.acm.org/citation.cfm?doid=1455229.1455232.

Jeong et al. "A QoS-Aware Memory Controller for Dynamically Balancing GPU and CPU Bandwidth Use in an MPSoC," Proceedings of the 49th Annual Design Automation Conference, 2012. pp. 850-855. http://dl.acm.org/citation.cfm?id=2228513.

(Continued)

*Primary Examiner* — Thomas Lee
*Assistant Examiner* — Volvick Derose
(74) *Attorney, Agent, or Firm* — Ridout and Maybee LLP

(57) ABSTRACT

Methods are provided for monitoring and adjusting performance of a mobile computing device having a windowing system. The windowing system is advantageously employed for both purposes. It generates performance data related to an application executed by a processor of the device and provides the performance data to a DFVS module of the device, which in turn determines the operating point of the device based on that data. As a consequence, the DFVS refrains from scaling-down the operating frequency of the processor in certain cases wherein idleness of the processor might provoke such a scale-down by a DVFS module that was informed only of application-agnostic performance data. The avoidance of inappropriate scale-downs may, for instance, improve the perceived smoothness of a progression of images presented on a display unit of the device.

16 Claims, 14 Drawing Sheets

(56) References Cited

U.S. PATENT DOCUMENTS

| | | | |
|---|---|---|---|
| 2008/0301474 A1* | 12/2008 | Bussa et al. | 713/300 |
| 2009/0049314 A1 | 2/2009 | Taha et al. | |
| 2010/0146316 A1* | 6/2010 | Carter et al. | 713/322 |
| 2010/0162023 A1* | 6/2010 | Rotem et al. | 713/340 |
| 2010/0287396 A1* | 11/2010 | Barth et al. | 713/323 |
| 2011/0099404 A1 | 4/2011 | Hartmann et al. | |
| 2012/0095817 A1 | 4/2012 | Kamil et al. | |
| 2012/0151065 A1 | 6/2012 | Rintaluoma et al. | |
| 2013/0139170 A1* | 5/2013 | Prabhakar et al. | 718/104 |
| 2013/0232346 A1* | 9/2013 | Wu | 713/300 |
| 2013/0238309 A1* | 9/2013 | Ting et al. | 703/21 |

OTHER PUBLICATIONS

Mochocki et al. "Signature-Based Workload Estimation for Mobile 3D Graphics," Proceedings of the 43rd annual Design Automation Conference, 2006. Sec. 5.3, pp. 595-596. http://dl.acm.org/citation.cfm?id=1147062.

Silpa et al. "Rank-Based Dynamic Voltage and Frequency Scaling for Tiled Graphics Processors," Proceedings of the eighth IEEE/ACM/IFIP international conference on Hardware/software codesign and system synthesis, 2010. pp. 3-12. dl.acm.org/citation.cfm?id=1878965.

* cited by examiner

Application's performance of tasks

Operating frequency of Processor

METHODS FOR MONITORING AND ADJUSTING PERFORMANCE OF A MOBILE COMPUTING DEVICE

FIELD OF TECHNOLOGY

The present application relates generally to monitoring and adjusting the performance of mobile computing devices and more particularly to economizing energy consumption of processors by means of Dynamic Voltage/Frequency Scaling (DVFS).

BACKGROUND

For computing devices, "performance" is an umbrella term with many sides. One side is the quality of the "product" that results from the computations performed by the device, whether measured by objective criteria or by human observation. Another side is the energy the device expended to produce its product. In general, these two sides are in natural tension: Improving energy efficiency of a device may degrade the quality of its product; conversely, obtaining higher quality often worsens energy efficiency. However, the "you get what you pay for" principle only goes so far. Merely throwing more power at a quality-based problem might lead to device overheating, which in turn might lead to even poorer quality.

When a computing device is portable and dependent on a limited supply of energy stored in a battery, improving performance in the sense of balancing power and quality becomes more important and more delicate, necessitating a smarter approach to energy usage. Improving some aspects of performance can be approached by reducing energy usage as much as possible while maintaining a minimum acceptable level of quality.

There are two parts to continually maintaining peak performance in this manner: monitoring performance and adjusting performance. These are cyclically related in that performance is adjusted in response to what monitoring reveals, and changes to the operational state of the computing device necessitates further monitoring. In particular, adjusting economizes energy according to the monitored levels of power and quality.

An obvious locus for economizing the energy consumption of a mobile computing device is a processor, such as a central processing unit (CPU) or a specialized co-processor, e.g., a graphics processing unit (GPU). A common practice in economizing the energy expended by a processor of a mobile computing device is the use of Dynamic Voltage/Frequency Scaling (DVFS), which is an algorithm for adjusting the voltage and/or frequency of a processor so as not to waste energy. The voltage and frequency are typically adjusted in tandem, because a higher voltage is generally needed to attain a higher frequency. Lowering the voltage lowers the power and therefore reduces the amount of energy consumed (and drawn from the battery). The basic principle is: Decrease the voltage (and power) of the processor if the accompanying decrease in its operating frequency will not adversely affect the quality of the device's product, as measured by some criterion.

One example of degraded quality—and a primary concern of this disclosure—is when the presentation of a sequence of images (also called "frames") on a display unit of a mobile computing device does not progress as smoothly as intended. While smoothness is ultimately judged by a human observer, it can be quantified, for instance, by detecting when a frame is "dropped," that is, is not rendered (i.e., prepared for presentation on the display unit) in time for an intended one of the display unit's Vsync (Vertical Synchronization) events, when the display unit can be refreshed. In turn, certain operational parameters of the device can be monitored and then used in a criterion for detecting a dropped frame.

A wide range of operational parameters of a device are also what are monitored by the device and used by a DVFS algorithm to decide how to adjust energy consumption. For example, the device's operating temperature can be an important consideration: If the device is too hot, it will use more power, making it even hotter, resulting in a race condition; thus, a DVFS module—software implementing the DVFS algorithm—may reduce processor voltage when a temperature sensor in the device reports to the DVFS module a temperature in excess of a pre-determined threshold.

Many of the operational parameters monitored and reported to the DVFS module pertain to the execution performance of the processor itself. Amongst such parameters (typically measured during a predetermined time interval or from the beginning of program execution) are: the total number of cycles performed, the total number of instructions executed, the number of stall cycles due to on/off-chip dependencies, the total number of data-cache misses, the total number of branch mispredictions, and so forth.

A standard behaviour of DVFS algorithms is to scale-down voltage and/or frequency of a processor in response to an indication that the processor is "idle" according to some criterion. In some systems, idleness may be determined by one or more of the following criteria: the number of cycles performed by the processor during a predetermined interval of time falls below a predetermined number, the number of instructions executed by the processor during a predetermined interval of time falls below a predetermined number, and the percentage of time the processor is executing instructions falls below a predetermined percentage. The theory behind designing a DVFS algorithm to scale-down frequency upon detecting processor idleness is that the processor is operating at a faster speed than necessary to do what it is tasked to do, thereby wasting energy.

It has been recognized that this standard strategy, while sound in many circumstances, is counterproductive in some other circumstances. This is because there are different reasons that a processor may be idle. It may happen that the processor is idle not because it has finished some task ahead of schedule, but because it has finished the task late, and the next task cannot begin right away; of particular interest to this disclosure is when the task of rendering a next frame cannot begin until the current frame has been presented on a display unit of a device, which can only take place at a specific time-point. The task might have finished late because the processor was not operating fast enough; in that case, its frequency should actually be scaled-up, not scaled-down. Alternatively, the task might have finished late because the processor, though operating at an appropriate speed, began the task at an inopportune time (i.e., it started "late," perhaps due to a scheduling problem or another, higher-priority task); in that case, the frequency should not be changed at all. In either of these cases, the standard strategy of having the DVFS module scale-down frequency will backfire. In the former case, the processor will be even less capable of handling its tasks on the desired schedule; it may end up missing even more deadlines than had its speed not been changed. In the latter case, a frequency scale-down will likely cause deadlines to be missed that would have been met had the processor speed been left alone and had, in all likelihood, the tasks re-aligned with the desired schedule of deadlines. For ease of reference, DVFS algorithms that employ this standard strategy without exception are referred to herein as "classic" DVFS algorithms.

Existing solutions to the occasionally counterproductive behaviour of classic DVFS algorithms are more-sophisticated algorithms that are keyed to operational parameters other than or in addition to processor idleness. For instance, U.S. Pat. No. 7,698,575 to Samson (referred to hereinafter as "Samson") teaches adjusting processor frequency based on a difference between a desired deadline (e.g., a Vsync event) and the actual completion time of a task (e.g., rendering a frame). If the difference is positive—i.e., the task is completed ahead of schedule—the DVFS module scales-down processor frequency; this concords with the behaviour of classic DVFS algorithms. If the difference is negative—i.e., the task is completed behind schedule—the frequency is scaled-up; this is the opposite of what a classic DVFS algorithm would do. This more-nuanced approach does, in some cases, avoid a classic DVFS algorithm's counterproductive behaviour.

Nevertheless, there are still other circumstances in which an algorithm in the style of Samson's will backfire. Although rendering frames in time for Vsync events is important, Samson's approach is fixated on monitoring and reacting to missed deadlines, oblivious to varying reasons for missed deadlines. It may happen that a deadline is missed even when the processor is operating at an appropriate speed, in which case a deadline-oriented DVFS algorithm will unnecessarily scale-up the frequency, only to then compensate for this mistake by reducing the speed back toward the original speed. In fact, as will be shown later, such an algorithm could also unnecessarily scale-down the frequency, only to then compensate for this mistake by increasing the speed back toward the original speed.

Thus, there is a need for more-reliable DVFS-based methods of monitoring and adjusting performance to economize energy consumption of a processor of a mobile computing device—while smoothly displaying a progression of images—methods which avoid the counterproductive adjustments sometimes perpetrated under existing DVFS approaches.

BRIEF DESCRIPTION OF THE DRAWINGS

Reference will now be made, by way of example, to the accompanying drawings, which show example embodiments of the present application, and in which.

DESCRIPTION OF EXAMPLE EMBODIMENTS

In one aspect, a method for managing energy consumption of a mobile computing device by means of a DVFS module of the device is disclosed. The method comprising the DVFS module obtaining application-based performance data related to execution of an application by a processor of the device and determining an operating point of the processor based on the application-based performance data. The method may further comprise a windowing system of the device generating the application-based performance data that the DFVS module obtains. The application may be a graphics application, and the application-based performance data may be based on the application's performance of a task related to rendering an image for presentation on a display unit of the device. The application-based performance data may be a time increment. The time increment may be compared to a target time increment based on two Vsync events.

In another aspect, a computing device is disclosed. The device comprises a one or more processors and a memory connected to the one or more processors. The memory contains processor-executable instructions for an application, for execution on a corresponding processor of the one or more processors, and processor-executable instructions for a DVFS module. The instructions for the DVFS module, when executed, cause the DVFS module to obtain application-based performance data related to execution of the application on the corresponding processor and determine an operating point of said processor, based on the application-based performance data. The memory may further contain processor-executable instructions for a windowing system, and the instructions that, when executed, cause the DVFS module to obtain the application-based performance data may cause the DVFS module to obtain said data from the windowing system. The instructions for the windowing system, when executed, may cause the windowing system to generate the application-based performance data.

In yet another aspect, a non-transitory, processor-readable storage medium is disclosed. The medium stores processor-executable instructions in a magnetic, optical, solid-state, or like format. When executed by a computing device, the instructions cause the device to perform a method for managing energy consumption of a mobile computing device by means of a DVFS module of the device. The method comprises the DVFS module obtaining application-based performance data related to execution of an application by a processor of the device and determining an operating point of the processor based on the application-based performance data.

Figure 1:
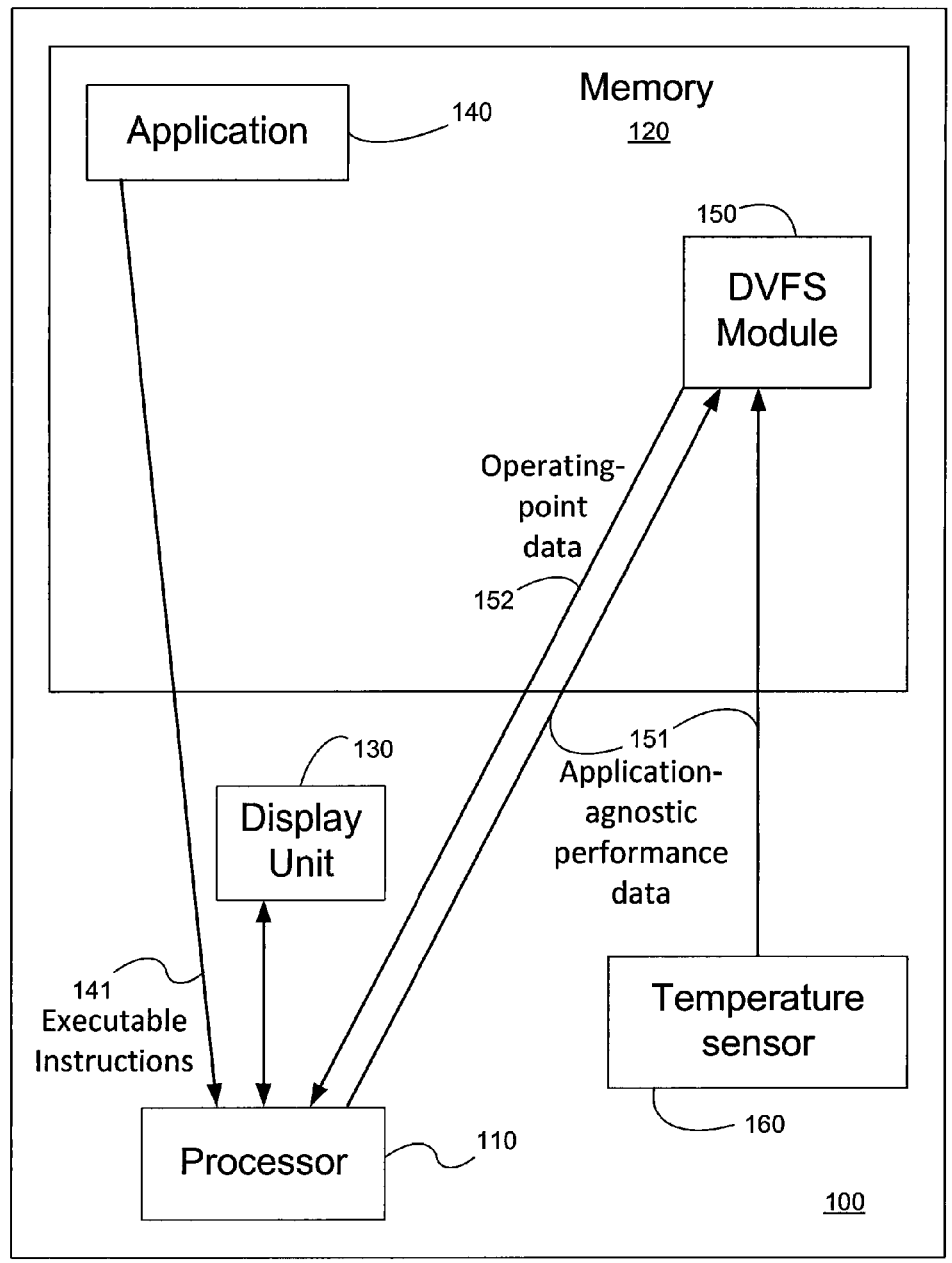
FIG. 1 shows a block diagram representing certain components of and data flows within a conventional mobile computing device employing a conventional approach to monitoring and adjusting performance of a that device.
Figure 2:
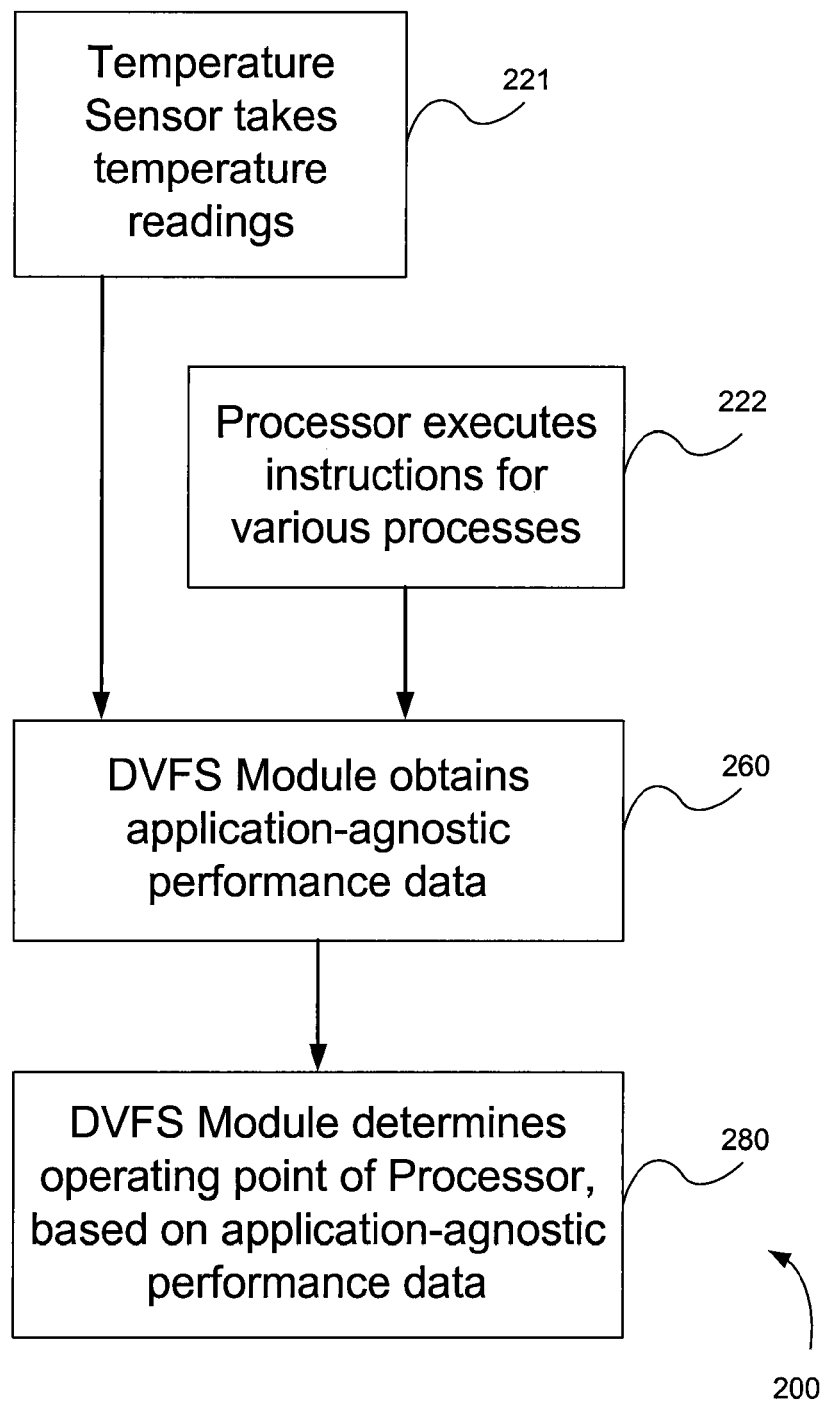
FIG. 2 shows a flowchart depicting such a conventional method of monitoring and adjusting performance in the device shown in FIG. 1.

Referring first to FIGS. 1 and 2, a conventional approach to monitoring and adjusting performance in a mobile computing device is shown. FIG. 1 shows a block diagram representing certain components of the device employing the conventional approach. FIG. 2 shows a flowchart depicting the steps of a corresponding method of monitoring and adjusting performance in the device shown in FIG. 1. Device 100 comprises processor 110, which is connected to memory 120 and display unit 130; the processor may be a CPU, a GPU, or other processor. Memory 120 may include one or more components of random-access memory (RAM), flash memory, and even removable memory. It may contain application 140 that comprises instructions 141 that are executed by processor 110. Display unit 130 may be a liquid crystal display (LCD) or an organic light-emitting diode (OLED) display; it may be a touchscreen, which can act additionally as an input device that enables a user to employ touches to or gestures near the display unit to make selections or enter data by means of a graphical user interface (GUI).

A conventional approach to monitoring and adjusting performance in mobile computing device 100 according to method 200 revolves around DVFS module 150, which is stored in memory 120 and executed by processor 110 or, if processor 110 is a GPU rather than a CPU, another processor, not shown. Monitoring of the performance of device 100 begins when temperature sensor 160 takes temperature readings at step 221 and processor 110 executes instructions at step 222, not only for application 140, but also for a variety of processes, some of which run in the background, unbeknownst to the average user of the device. The temperature readings are an example of performance data 151 that is herein termed "application-agnostic"—it reflects the performance of device 100, but is ignorant of which applications are executing and are therefore partly (and perhaps indirectly) responsible for the data, in this case, the temperature of the device. The execution of processor 110 likewise results in application-agnostic performance data 151 that can be monitored, such as the total number of cycles performed, the total number of instructions executed, the number of stall cycles due to on/off-chip dependencies, the total number of data-cache misses, the total number of branch mispredictions, and so forth.

Next, at step 260, DVFS Module 150 obtains application-agnostic performance data 151 from processor 110 and/or temperature sensor 160 (perhaps via processor 110). At step 280, DVFS module 150 analyzes the various input parameters, judging them according to predetermined criteria, to determine the operating point of processor 110. In the analysis, there may be conflicting indications of how the operating frequency of processor 110 should be adjusted. Intensive activity of processor 110 would ordinarily indicate that the processor should operate at a higher frequency; but countering a dangerously high temperature of device 100 (by decreasing the frequency of processor 110) would take higher precedence. Not shown in FIG. 2, DVFS module 150 sends operating-point data 152 to processor 110; depending on the embodiment, the transfer may be unconditional or, alternatively, may occur only if it is needed in order to effect a change to the operating point, perhaps by means of voltage and frequency controllers, not shown in FIG. 1. Processor 110, by design, has a finite set of operating points. For example, a Qualcomm MSM890 processor has six different operating points, with (operating frequency, rail voltage) pairings of (384 MHz, 0.900 V), (594 MHz, 0.950 V), (810 MHz, 1.025 V), (1.026 GHz, 1.075 V), (1.242 GHz, 1.150 V), and (1.512 GHz, 1.200 V).

Figure 9:
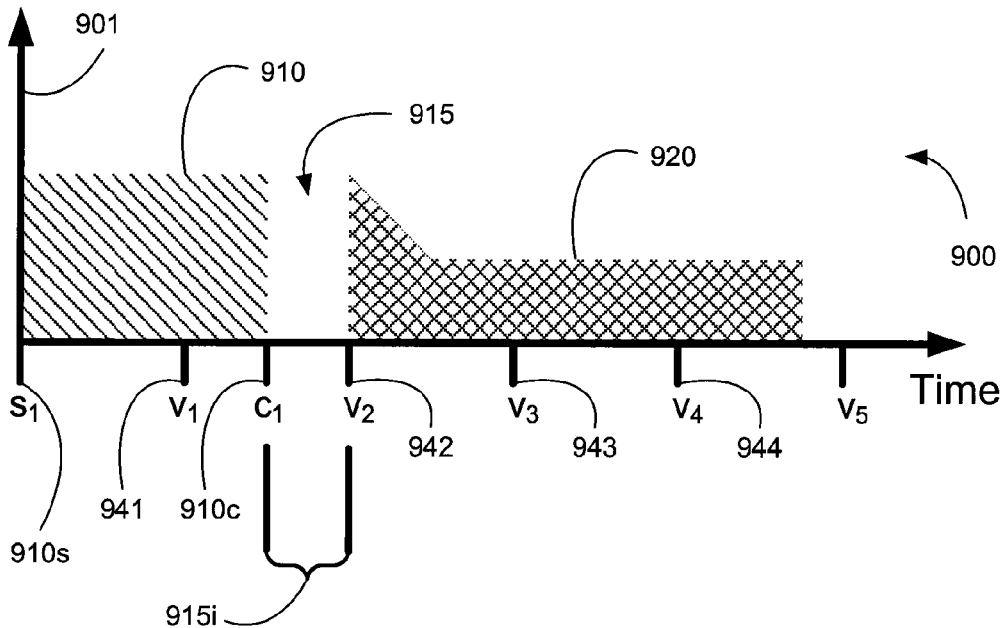
FIGS. 9 and 10 show timing diagrams that depict possible energy-consumption scenarios under a conventional approach to monitoring and adjusting performance according to FIGS. 1 and 2.
Figure 9:
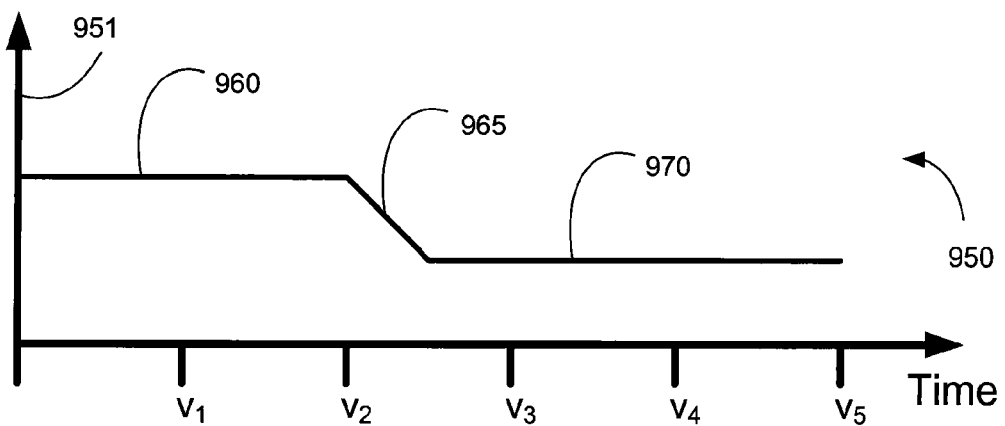
Figure 10:
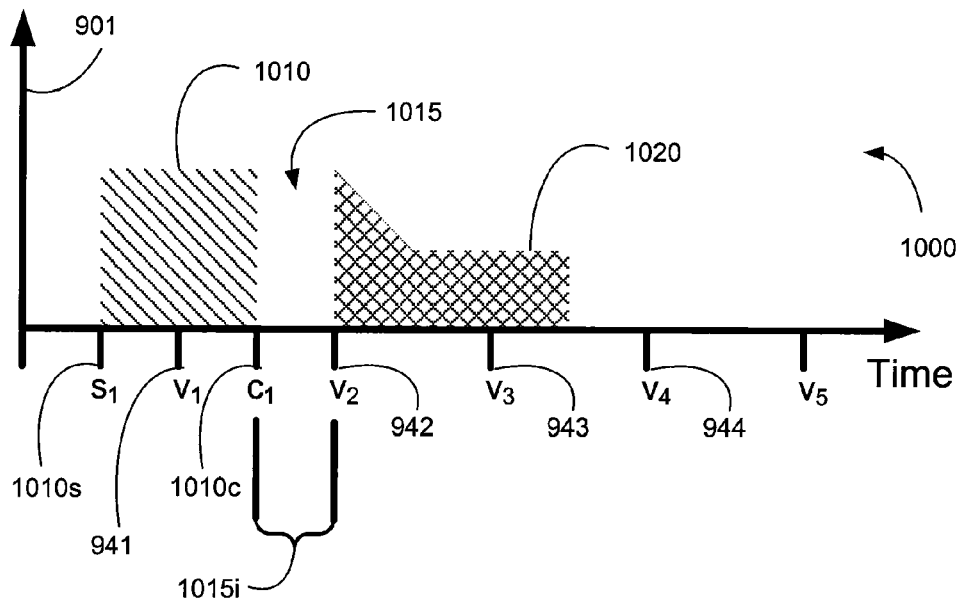
Figure 10:
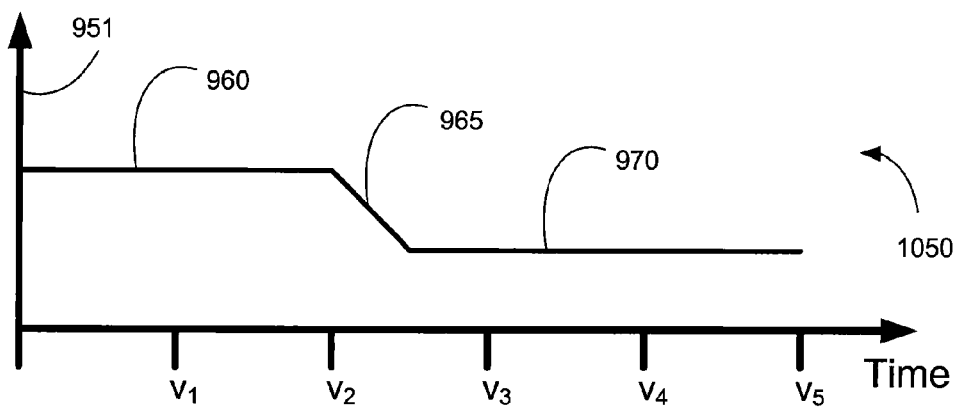

FIGS. 9 and 10 show timing diagrams that depict possible energy-consumption scenarios under a conventional approach to monitoring and adjusting performance according to FIGS. 1 and 2. Both scenarios illustrate counterproductive behavior of a classic DVFS algorithm that inflexibly reacts to processor idleness by scaling-down processor frequency. In each of FIGS. 9 and 10, as well as FIG. 11 through 14, a single timing diagram is depicted in two parallel views, the two views having identical, horizontal time scales, with equivalent time-points aligned vertically; in particular, corresponding Vsync events $V_1$ to $V_5$ are located by means of vertically aligned tick-marks on the scales. Vsync events are singled out because an important measure of the quality of the product of device 100 despite energy conservation is avoiding dropped frames. In each timing diagram, the lower view depicts the operating frequency of processor 110 over time; vertical axis 951, though depicted without any specific scale, is to be understood as measuring processor speed in an appropriate unit, such as megahertz or gigahertz. In each timing diagram, the upper view depicts, somewhat informally, the workload of processor 110 as it executes application 140. Vertical axis 901 represents the rate, over time, at which the application is completing tasks, represented as shaded regions. Two tasks representing the same workload are depicted by regions having equal areas. For simplicity of illustration, consecutive tasks in a single timing diagram are assumes to comparable (e.g., rendering two slightly different views of a map, as a user of device 100 scrolls the viewport); thus, the consecutive tasks in a single timing diagram are represented by regions of equal area. The height of a region for any time-point is assumed to be proportional to the operating frequency of processor 110 at the same time-point; thus, the contours of each region in an upper view mimic the contours of the frequency graph in the lower view. Consequently, lowering the operating frequency of processor 110 has the effect of shortening the height and stretching the width of a region. Transitions from one frequency to another are depicted in each of FIGS. 9 through 14 by way of 45-degree diagonal line segments, but the skilled person will appreciate that this is merely a simplifying pictorial device used to convey that transitions are not instantaneous.

FIG. 9 depicts a first example of counterproductive behaviour of a classic DVFS algorithm, in which the operating frequency of processor 110 is initially too low for task 910—which started at time-point $S_1$ 910, in sync with a Vsync event—to be completed in time for the next Vsync event, $V_1$ 941; the conclusion $C_1$ 910c of task 910 after the latter Vsync event constitutes a dropped frame. (Most tasks are depicted as beginning at Vsync events because an important task is the rendering of images for presentation on display unit 130; in order to start, a rendering task must wait for a Vsync event.) Under the rubric of a classic DFVS algorithm, idle period 915 between tasks 910 and 920 is the crucial consideration. Time increment 915i from conclusion $C_1$ 910c of task 910 to following Vsync event $V_2$ 942 is used in some manner to trigger transition 965 from initial frequency 960 to lower frequency 970. For example, a classic DVFS algorithm might judge processor 110 to be idle 50% of the time between consecutive Vsync events and therefore determine that the frequency should be scaled-down 50%, as depicted in lower view 950. The net result of this scale-down can be clearly seen from upper view 900: Instead of avoiding a further dropped frame after the initial one at $V_1$ 941, the protracted performance of task 920 drops frames at two Vync events, $V_3$ 943 and $V_4$ 944.

FIG. 10 depicts a second example of counterproductive behaviour of a classic DVFS algorithm, in which the operating frequency of processor 110 is initially adequate, but for some reason task 1010 starts "late" (i.e., not promptly at a Vsync event) at $S_1$ 1010s; consequently, task 1010 completes at time-point $C_1$ 1010c, resulting in a dropped frame at Vsync $V_1$ 941. Idle period 1015 between tasks 1010 and 1020 has the same impact as did idle period 915 of FIG. 9, and time increment 1015i between conclusion $C_1$ 1010c of task 1010 and following Vsync event $V_2$ 942 is interpreted by a classic DVFS algorithm in exactly the same way as was time increment 915i of FIG. 9. Consequently, the frequency graph in lower view 1050 is identical to that in FIG. 9, and upper view 1000 shows that the protracted performance of task 1020 results a dropped frame at Vsync event $V_3$ 943. Had the frequency been maintained—which would have been the case had methods according to the present disclosure been employed—task 1020 (which started promptly at a Vsync event, as it normally should) would have completed in time for that Vsync event—as in FIG. 13.

These counterproductive behaviours occur because the DVFS algorithm lacks information specific to application 140. Its inputs are only application-agnostic performance data 151 from processor 110 and temperature sensor 160. (Temperature data is not reflected in these examples.)

Figure 11:
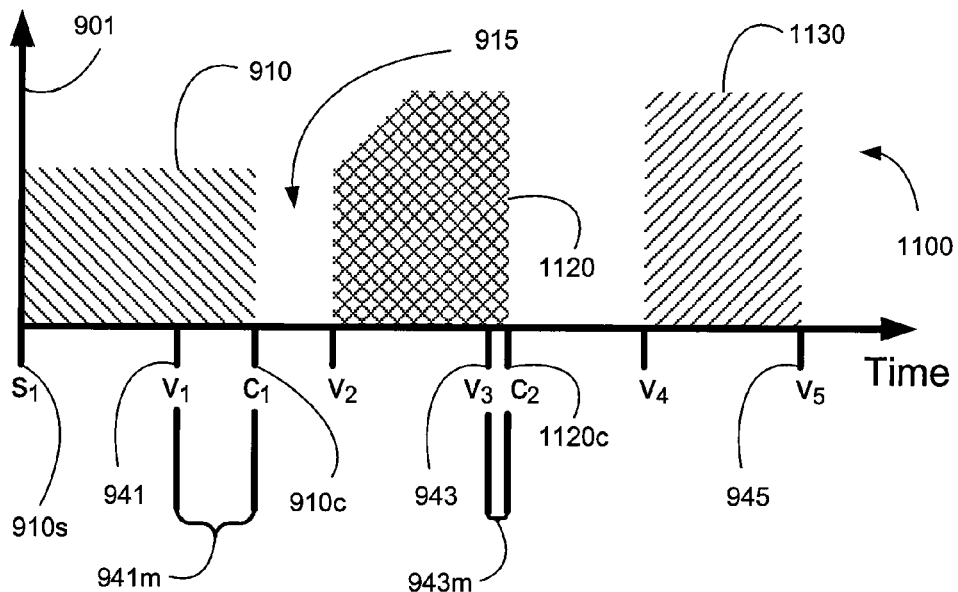
FIGS. 11 and 12 show timing diagrams that depict possible energy-consumption scenarios under an alternative prior-art approach to monitoring and adjusting performance that also accords with FIGS. 1 and 2.
Figure 11:
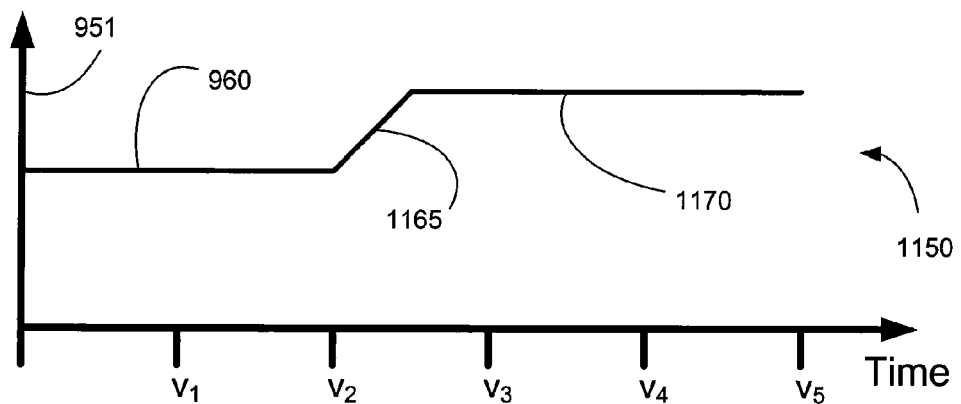
Figure 12:
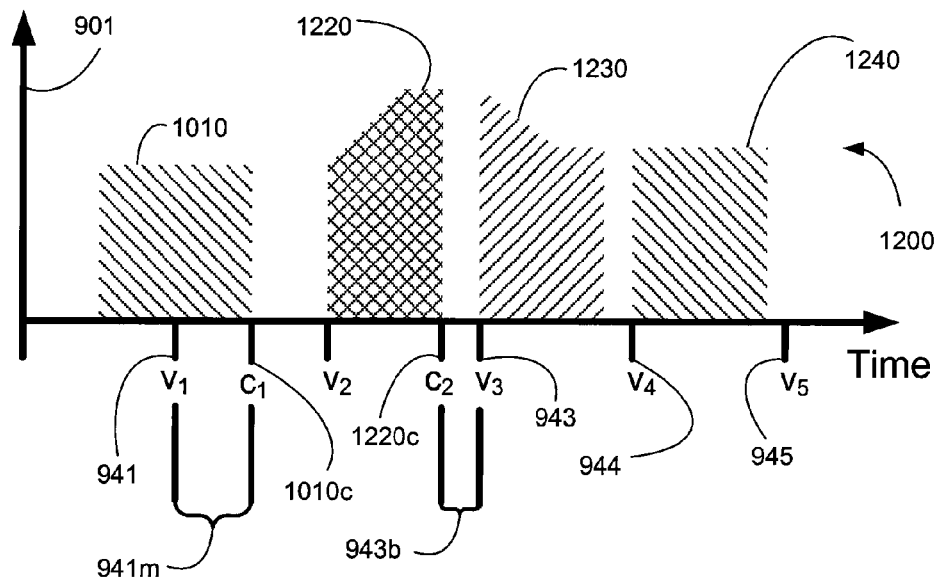
Figure 12:
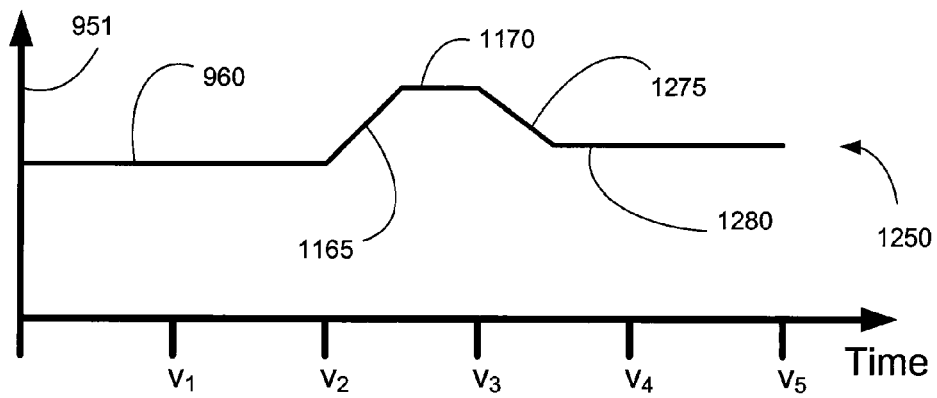

As mentioned earlier, these counterproductive behaviours of classic DVFS algorithms have been previously recognized. FIGS. 11 and 12 depict possible energy-consumption scenarios under Samson's approach to monitoring and adjusting performance. Although such a Samson-inspired DVFS algorithm is advantageous compared to a lassic DVFS algorithm, it is still deficient due to its dependence on application-agnostic performance data 151.

FIG. 11 depicts a first example of a possible power-management scenario according to a Samson-inspired DVFS algorithm, a scenario in which the counterproductive behaviour exhibited in FIG. 9 is avoided. The frequency graph in lower view 1150 begins at frequency 960 and the sequence of tasks in upper view 1100 begins with task 910; both beginnings are identical to those in FIG. 9. However, a Samson-inspired DVFS algorithm is not concerned with idle period 915. Rather, the focus is on the extent to which a Vsync event is missed (as in this case) or beat. Time increment 941m from Vsync event $V_1$ until conclusion $C_1$ 910c of task 910 is the crucial consideration. For example, a Samson-inspired DVFS algorithm might judge processor 110 to have missed Vsync event $V_1$ 941 by 50% of the time between consecutive Vsync events and therefore determine that the frequency should be scaled-up 50%, as depicted by transition 1165 to increased frequency 1170 in lower view 1150. The net result of this scale-up can be clearly seen from upper view 1100: Instead of creating, as was the case in FIG. 9, a further (and an additional) dropped frame after the initial one at $V_1$ 941, the sped-up performance of task 1120 almost avoids a dropped frame at Vsync event, $V_3$ 943. The very small time increment 943m from Vsync event $V_3$ until conclusion $C_2$ 1120c of task 1120 might or might not be acted upon, depending on exactly how the algorithm is implemented. (Recall that the frequency of processor 110 cannot be varied continuously, but can only be shifted amongst a relatively small set of frequencies.) Even if the operating frequency is not further increased, task 1130 can complete in time for Vsync $V_5$ 945.

FIG. 12 depicts a second example of a possible power-management scenario according to the teachings of Samson, a scenario in which the counterproductive behaviour exhibited in FIG. 10 is not avoided. The frequency graph in lower view 1250 begins at frequency 960 and the sequence of tasks in upper view 1200 begins with task 1010; both beginnings are identical to those in FIG. 10. Just as in FIG. 11, time increment 941m from Vsync event $V_1$ until conclusion $C_1$ 1010c of task 1010 is again used to scale-up frequency by 50%. However, unlike in the scenario depicted in FIG. 11, a scale-up is just as unnecessary as it was in the scenario depicted in FIG. 10. When a Samson-inspired DVFS algorithm "overshoots" in its determination of an operating frequency of processor 110, it subsequently self-corrects. Time increment 943b between conclusion $C_2$ 1220c of task 1220 and Vsync $V_3$ 1243 is the time by which application 140 beat the deadline $V_3$. For example, beating a deadline by 25% of the time increment between consecutive Vsync events, the DFVS algorithm can invoke transition 1275 from frequency 1170 to lower frequency 1280 as shown in lower view 1250. As upper view 1200 depicts, tasks 1230 and 1240 will complete in time for Vsync events $V_4$ 1244 and $V_5$ 1245, respectively. Even if, under a Samson-inspired DVFS algorithm, the frequency converges to the optimal value (which, in this case, was initial frequency 960), energy has been wasted due to the over-shooting and self-correcting adjustments.

Although the hypothetical Samson-inspired DVFS algorithm is depicted above in terms of a single processor within a configuration consistent with that depicted in FIG. 1, Samson actually describes a system with two processors. A single task required for rendering an image is split between two subtasks: A CPU performs a first subtask, which must be completed before the second task is begun by a GPU. What Samson's algorithm keys off of is the time increment by which the completion of the second subtask misses or beats a Vsych event. In one sense, that algorithm knows something about the specific application that performs a task by means of the CPU and the GPU: It knows when the task is ultimately completed, because the GPU ceases execution. But a fuller analysis reveals that the algorithm is ignorant of when the task as a whole began executing on the CPU. In fact, Samson gives an example in which each of the CPU and GPU is running fast enough to complete its respective subtask, but a deadline is missed. The methods disclosed herein would not provoke either the GPU or the CPU to operate at a higher frequency in such case, since each is doing its job adequately. Therefore, a Samson-inspired DVFS algorithm is application-agnostic as the term is used herein. As meant in this disclosure, "application-based performance data" must be based at least in part on data obtained explicitly (though perhaps indirectly, as will be explained below) from the application itself.

The inventors have realized that conventional approaches to monitoring and adjusting performance—whether the classic type considered in reference to FIGS. 9 and 10 or the Samson-type considered in reference to FIGS. 11 and 12—can behave counterproductively because of their dependence on application-agnostic performance data. Monitoring application-based performance data can be advantageous both for dynamically adjusting energy consumption and for other diagnostic purposes.

Figure 4:
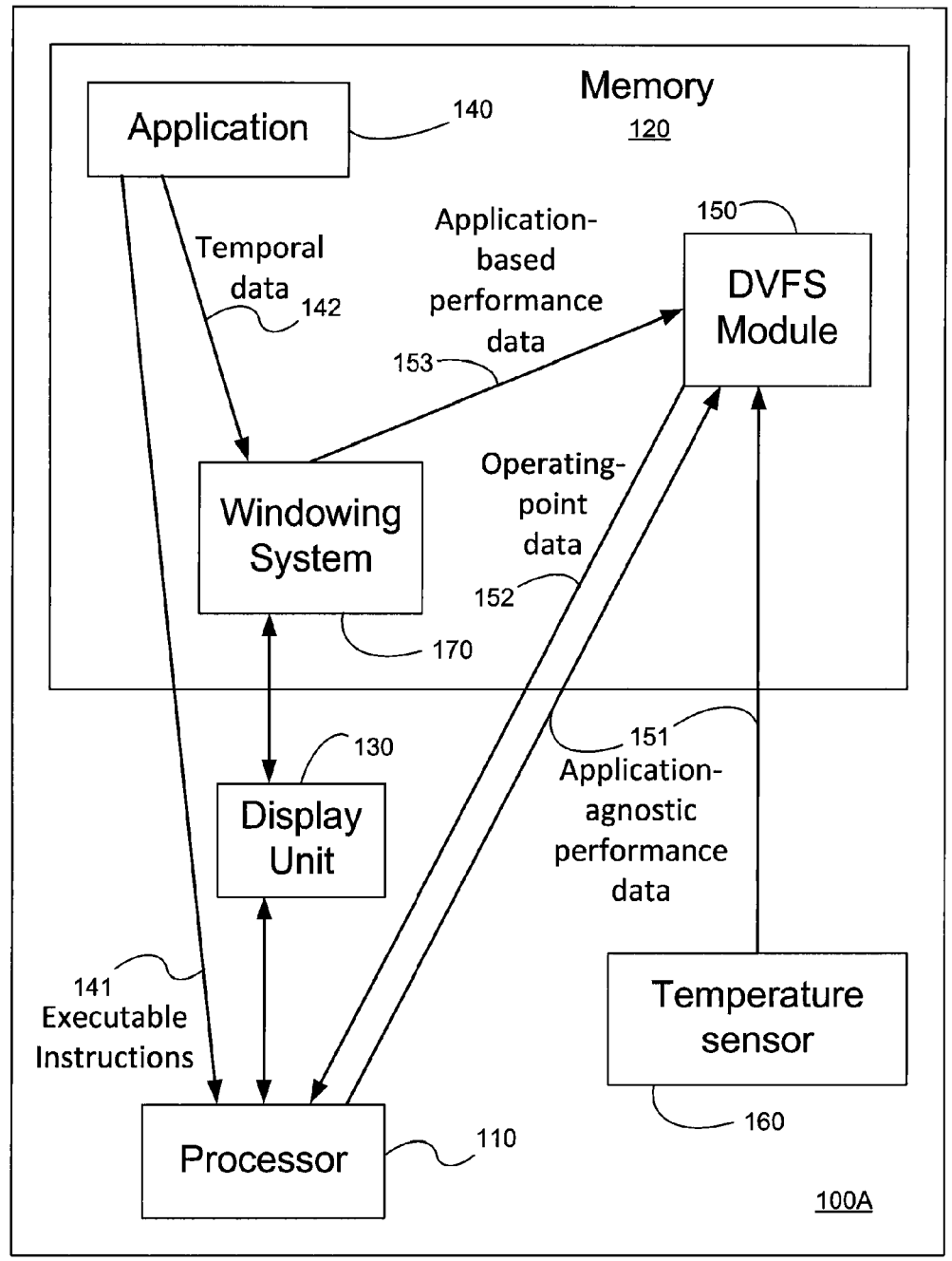
FIG. 4 shows a block diagram representing certain components of and data flows within a mobile computing device according to the present disclosure, which device employs the approach to monitoring and adjusting performance as depicted in FIG. 3.

The inventors have further realized that windowing system 170 of FIG. 4 is in a unique position to provide new avenues for and types of performance monitoring and performance adjusting in mobile computing device 100A. A windowing system enables multiple applications to simultaneously contribute—each in its respective window—to a frame presented on display unit 130; consequently, windowing system 170 obtains graphics data necessary to present the window of each such application. The skilled person recognizes that the term "windowing system" is used in a variety ways in the art. As meant herein, the term is taken to be a broad term that might or might not include managerial functions for determining how windows are arranged and overlap.

Though available for decades in desktop and laptop computing systems, windowing systems are a recent addition to small mobile computing devices such as smartphones, superphones, tablet computers (also referred to simply as "tablets"), and phablets (which, as the name suggests, are intermediate in size and functionality between phones and tablets). This development has been made possible by increased display resolutions and processor speeds that actually surpass what was possible in early desktop/laptop environments; it has been spurred by consumers' expectations for ever richer computing experiences on small devices. As energy conservation is less a concern in desktop computers and even in laptop computers than in small mobile computing devices, the potential of windowing system 170 to additionally obtain and process application-based performance data had previously gone unrecognized.

Figure 3:
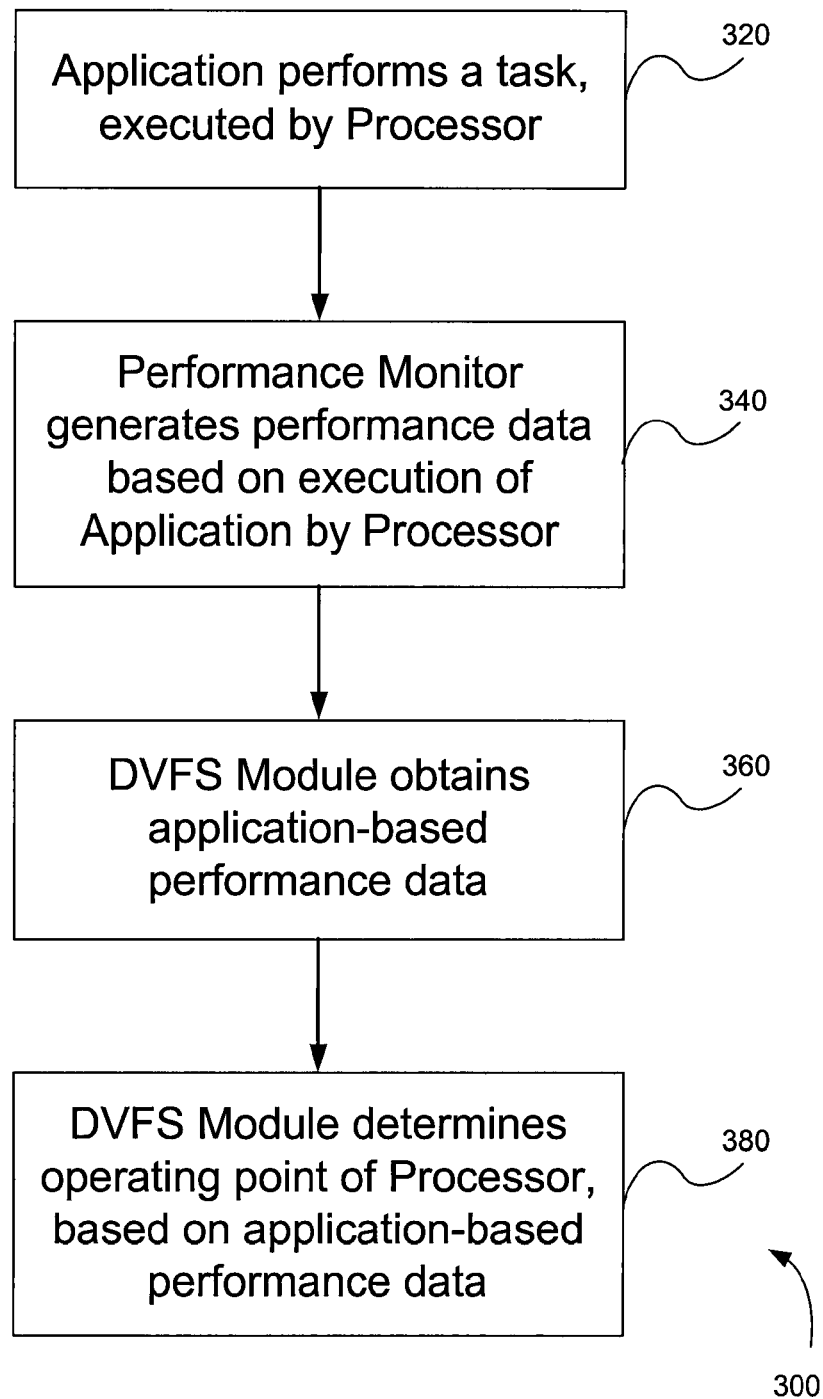
FIG. 3 shows a flowchart depicting a method of monitoring and dynamically adjusting performance of the computing device depicted in FIG. 4.

These new insights will now be outlined in reference to FIGS. 3 and 4. FIG. 3 shows a flowchart depicting the logic flow of novel method 300 for monitoring and dynamically adjusting performance of device 100A of FIG. 4, which shows a block diagram of components of the device and the novel data flow therewithin according to method 300. The conventional approach to monitoring and adjusting performance in a mobile computing device 100 as shown in FIGS. 1 and 2 is still relevant for the novel approach disclosed herein. What is missing from the depiction of device 100 in FIG. 1 is windowing system 170 as shown in FIG. 4. At a high level, windowing system 170 can be used as a bridge between application 140 and DVFS module 150 if all three components (typically software) are co-operatively programmed. The first part of the bridge, denoted by arrow 142 in FIG. 4, enables windowing system 170 to gather previously untapped information from application 140; this allows a novel type of performance monitoring. The second part of the bridge, denoted by arrow 153, enables windowing system 170 to communicate with DVFS module 150 to influence performance adjusting in new ways.

In reference to FIG. 3, novel method 300 begins at step 320 with application 140 performing a task, executed by processor 110. This may result in temporal data such as the time-point when the task began, the time-point when the task was completed, or the time duration for completing the task. Temporal data 142 may be stored in memory 120 at the behest of application 140; in contrast to conventional method 200, this may require adding code to the application to memorialize this temporal data (which is not directly relevant to the performance of the primary task of application 140).

At step 340, a performance monitor (such as windowing system 170) generates performance data based on execution of application 140 by processor 110. The performance monitor may obtain the temporal data 142 in a number of ways known to the skilled person. For example, application 140 may be coded so that the memorialization of temporal data mentioned above can comprise storing data in memory 120 so that it is accessible by the performance monitor. The type of processing required for the performance monitor to generate application-based performance data 153 depends on the nature of the temporal data. If temporal data 142 may include a time increment, "generating" consists merely of obtaining the data. If temporal data 142 is one or two time-points, generating may include computing a time increment related to the application's performance of the task, based on temporal data 142.

At step 360, DVFS module 150 obtains the application-based performance data 153 generated by the performance monitor (such as windowing system 170). This can be accomplished, for instance, by the performance monitor storing the data in memory 120 so that it can be accessed by DVFS module 150.

At step 380, DVFS determines operating-point data 152 for processor 110, based on application-based performance data 153.

Details and various embodiments of method 300 will now be described in reference to FIGS. 5 through 8.

Figure 5:
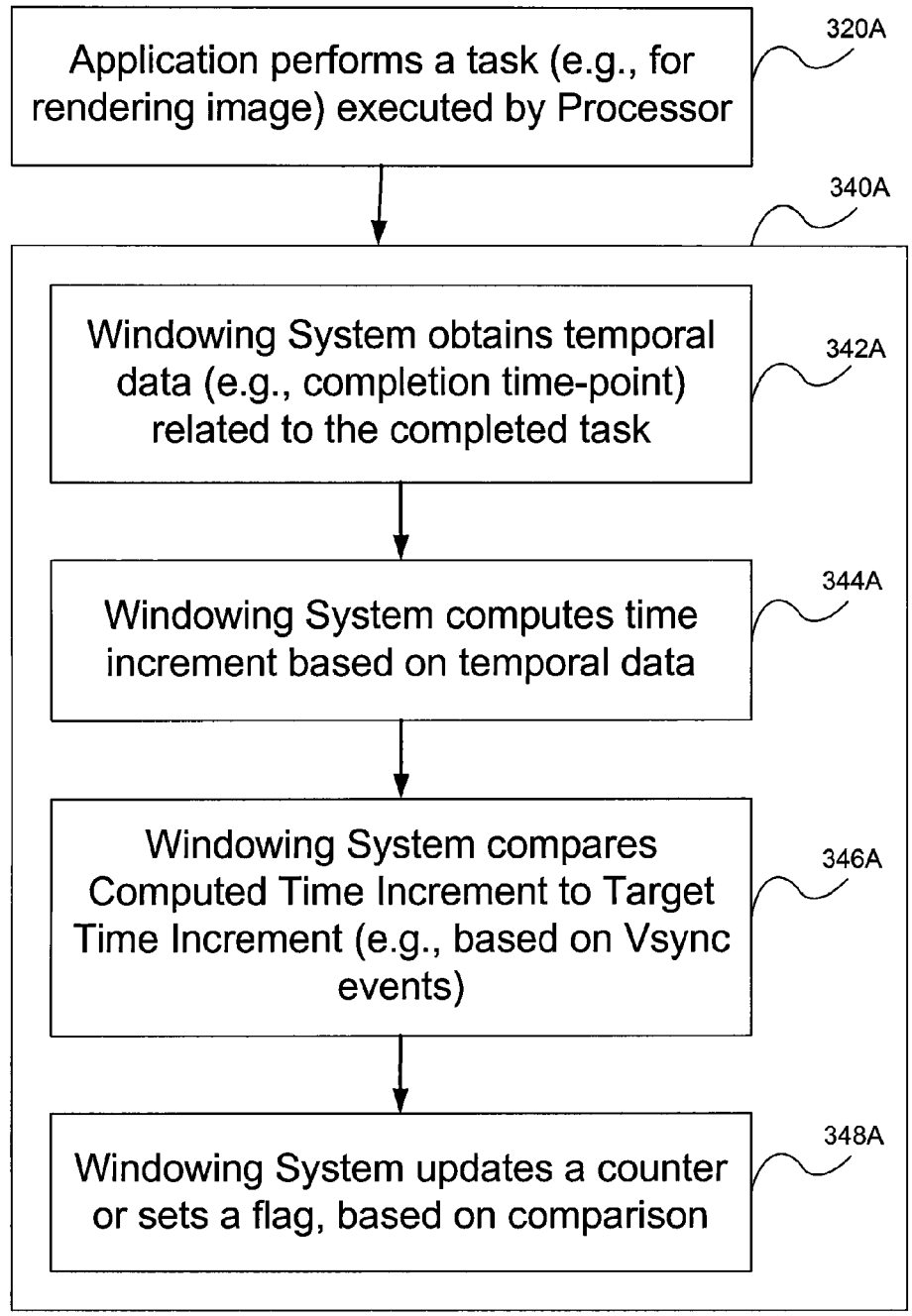
FIG. 5 shows a flowchart depicting details of one embodiment of the monitoring portion of the method depicted in FIG. 3.

Referring to FIG. 5, a flowchart details, in context, one embodiment of step 340 of method 300. The context is that the performance monitor is specifically windowing application 170, and application 140 is a graphics application that performs at step 320A a task that is relevant to windowing application 170. For example, the task may be one that contributes to the rendering of an image for presentation on display unit 130. In this context, step 340A may be broken down into several substeps. At step 342A, windowing system 170 obtains—in any manner known in the art temporal data 142 of any of the types mentioned earlier, such as a time-point at which application 140 completed its task. At step 344A, windowing system 170 computes a time increment based on temporal data 142. For example, if temporal data 142 obtained at step 342A is a time-point at which application 140 started its current task, then the time increment might be computed as the difference between the current time-point and the starting time-point. Alternatively, if temporal data 142 obtained at step 342A is a time-point at which application 140 completed its current task, then the time increment might be computed as the difference between the completion time-point and an inferred starting time-point, such as a recent Vsync event. Thus, the computation of the time increment may involve data other than what was explicitly obtained from application 140.

Continuing in reference to FIG. 5, at step 346A, windowing system 170 compares the computed time increment to a target time increment. The target time increment is another example of data used by windowing system 170 that was not obtained from application 140. It is important to note the role windowing system 170 can play as a gathering point for information from various sources. The target time increment is typically based on Vsync events. For example, if the refresh rate of display unit 130 is 60 frames per second (fps), the target time interval may be chosen to be 1/60 of a second (perhaps rounded down to 16 milliseconds, depending on the format in which device 100A or its subsystems convey this parameter), which is the time increment between two consecutive Vsync eveents. However, it may be that for videos or certain computationally intensive graphics application, it is acceptable to present a new image at every other Vsync event—provided a regular schedule (consistently rendering a frame within 1/30 of a second) is adhered to. Thus, the two Vsync events on which the target time increment is based need not be consecutive. Moreover, due to the variations in processor workload required to render different frames, it may be prudent to set the target time increment at a more conservative level, say 14 ms in the case of 60 fps or 28 ms in the case of 30 fps, to provide with a built-in margin of safety. Thus, if processor 110 has its operating frequency adjusted so that application 140 can complete its tasks within the conservative target time interval, it will still be able to complete an anomalous task that takes a bit longer than most of the other tasks.

Still in reference to FIG. 5, at step 348A, windowing system 170 makes available to DVFS module 150, in some form, application-based performance data 153 that reflects the outcome of the comparison performed at step 346A. One way this may be done is by setting a flag, accessible by and recognizable to DVFS module 150, indicating whether or not the computed time increment generated at step 344A exceeds the target time increment. Another way is to increment a counter flag, accessible by and recognizable to DVFS module 150, if and only if the computed time increment generated at step 344A exceeds the target time increment. Other possible ways will be apparent to the skilled person.

To reiterate, FIG. 5 depicts only some possible implementations of method 300. Windowing system 170 may alternatively or additionally make the computed time increment or even raw time-points available to DVFS module 150. The skilled person will appreciate that there are various ways to distribute computational steps (such as subtraction) and decision-making (such as comparisons) between different modules of device 100A.

Figure 6:
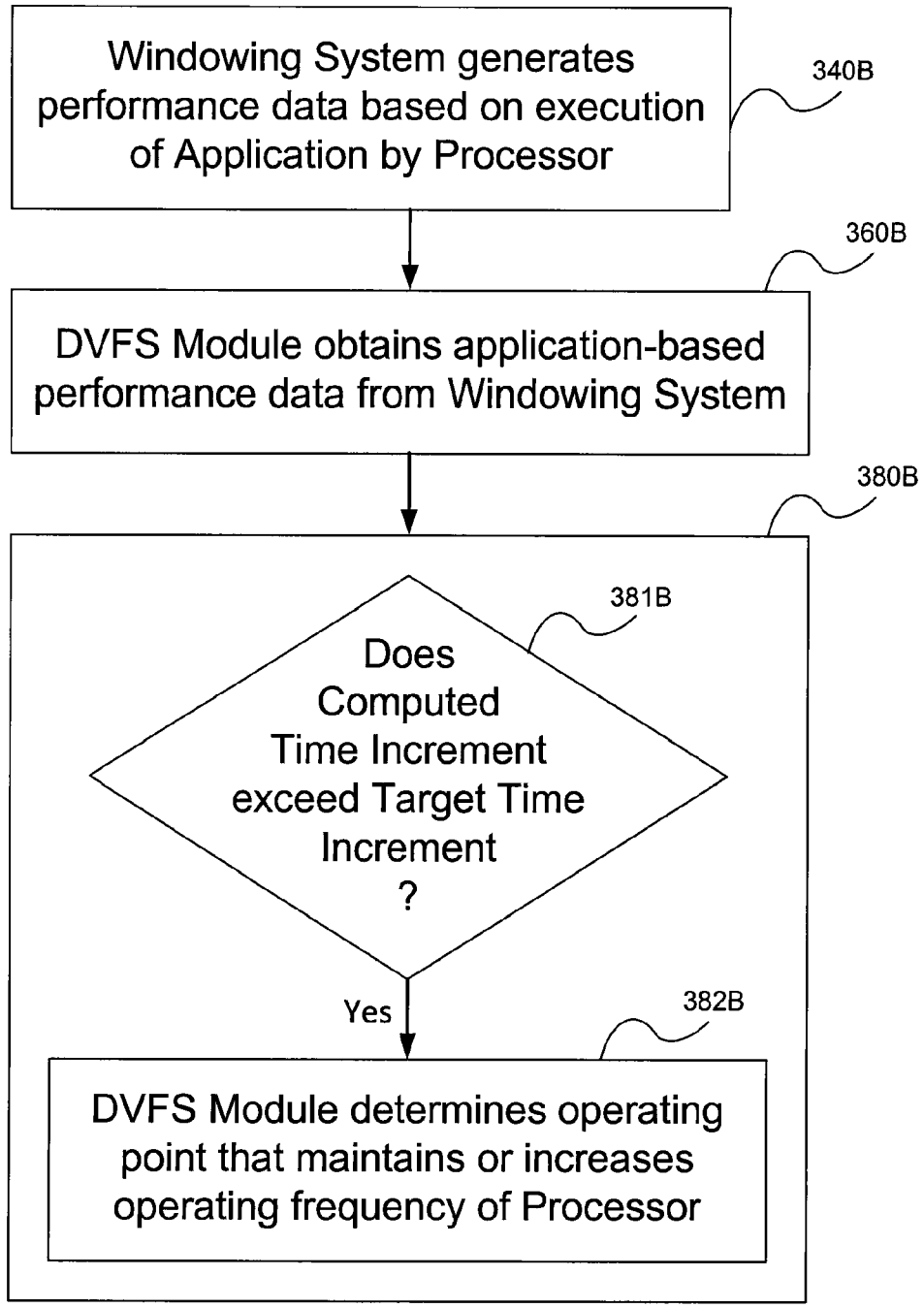
FIG. 6 shows a flowchart depicting details of one embodiment of the adjusting portion of the method depicted in FIG. 3.

Turning to FIG. 6, a flowchart depicts most of an alternative embodiment of method 300, in which embodiment DVFS module 150 takes on more of the decision-making duties. In this case, at step 340B, windowing system 170 generates application-based performance data 153 without performing the comparison at step 346A of FIG. 5. It may, however, perform steps similar to steps 342A and 344A to obtain temporal data 142 and compute a time increment. At step 360B, DVFS module 150 obtains application-based performance data 153 that includes a computed time increment (which may have been computed by windowing system 170 or perhaps even by application 140). At step 380B, DVFS module 150 makes a determination of the operating point of processor 110 in one of various ways possible. In some embodiments, DVFS module 150 determines at step 381B whether the computed time increment exceeds the target time increment. If so, at step 382B, DVFS module 150 determines the operating point such that the operating frequency of processor 110 is increased.

Figure 7:
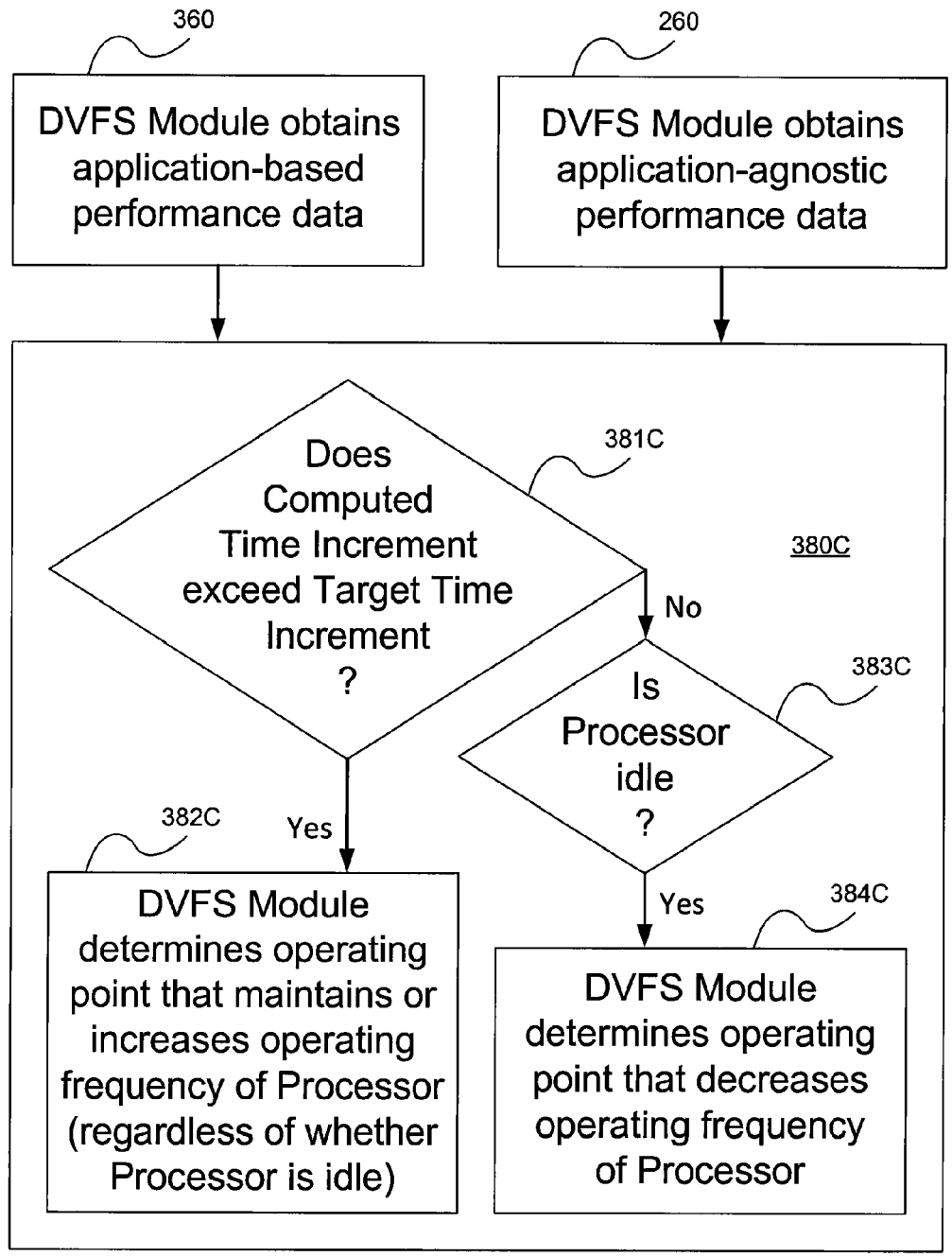
FIG. 7 shows a flowchart depicting details of an alternative embodiment of the adjusting portion of the method depicted in FIG. 3.

FIG. 7 illustrates that novel method 300 of FIG. 3 does not completely displace conventional method 200 of FIG. 2. It can be seen from FIG. 4 that DVFS module 150 may still obtain application-agnostic performance data 151 from processor 110 and from temperature sensor 160. The latter input is always important, as an excessively high temperature of device 100A can degrade its performance in terms of speed and/or quality and may even damage the device. FIG. 7 details part of an alternative embodiment of method 300 in which both novel step 360 of FIG. 3 and conventional step 260 of FIG. 2 are performed independently (perhaps in parallel—no sequencing of the two steps is implied). DVFS module 150 obtains application-based performance data 153 at step 360 and obtains application-agnostic performance data 151 at step 260.

The import of FIG. 7 is that, even if processor 110 is idle (as detected by application-agnostic performance data 151), this occurrence—which would typically cause a classic DFVS algorithm to scale-down the operating frequency of processor 110—can be trumped by a,counter-indication based on application-based performance data 153. As shown in the particular embodiment of step 380C, this is accomplished by first testing at step 381C whether the computed time increment exceeds the target time increment. If so, the determination is directly made at step 382C—without consulting application-agnostic performance data 151—so set the operating point of processor 110 so that the operating frequency is increased or, at the very least, maintained. If not, only in that circumstance is a conventional test performed at step 383C to see whether processor 110 is idle. (It should be noted that a variety of other, conventional processor statistics are available for testing.) If so, then at step 384C, DVFS module 150 sets the operating point of processor 110 so that the operating frequency is decreased. Of course, there are still other alternatives to step 380 in which the operating frequency of processor 110 is maintained or increased, based on application-based performance data 153, despite idleness of the processor. For example, if windowing system 170 sets a flag, at step 348A of FIG. 5, indicating that the computed time increment exceeds the target time increment, testing this flag would accomplish the same thing as performing the comparison at step 381C.

As the skilled person is aware, a DVFS module is generally software implementing a DVFS algorithm. For changes to the operating point to take place, a software-based DVFS module must co-operate with switches that physically set the operating frequency and voltages of processor 110. In light of that, this disclosure uses phrases such as "DVFS module 150 determines/sets/scales-up/scales-down" is the broadest possible sense: The module might only make a determination as to what the operating point of processor 110 should be; it might additionally request hardware switches to make changes to the operating point, or it might, in some embodiments, physically adjust the operating point.

It should also be reiterated that the temperature of device 100A is of pre-eminent importance. The simplified flowcharts herein omit any mention of temperature, yet this potentially damaging parameter could trump even the decision-making of steps 381C and 382C.

Figure 13:
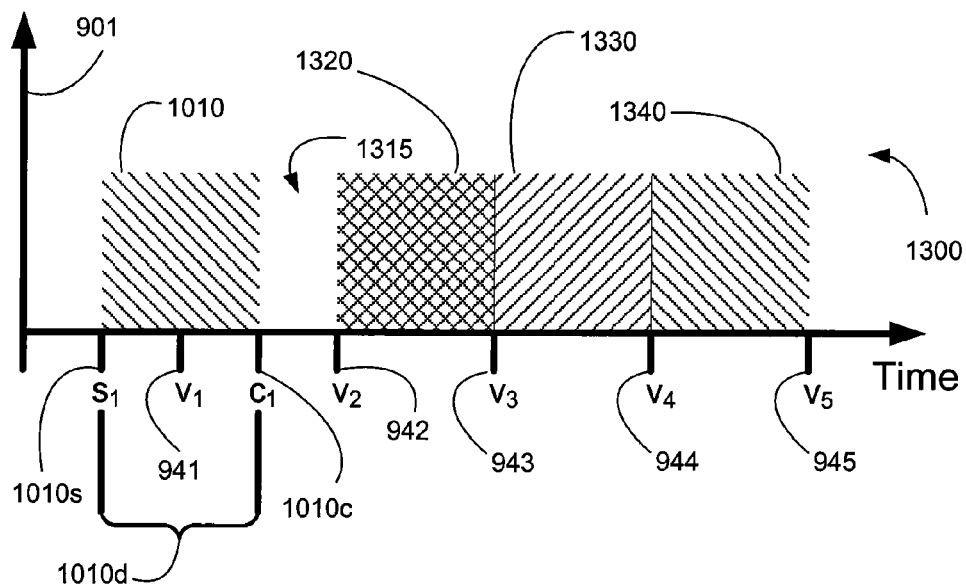
FIGS. 13 and 14 show timing diagrams that depict possible energy-consumption scenarios under an approach to monitoring and adjusting performance according to the present disclosure; and Like reference numerals have been used in different figures to denote like components.
Figure 13:
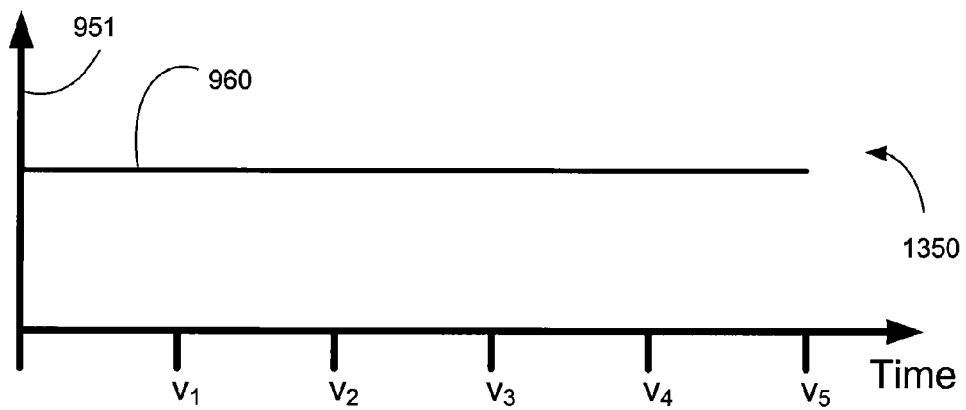
Figure 14:
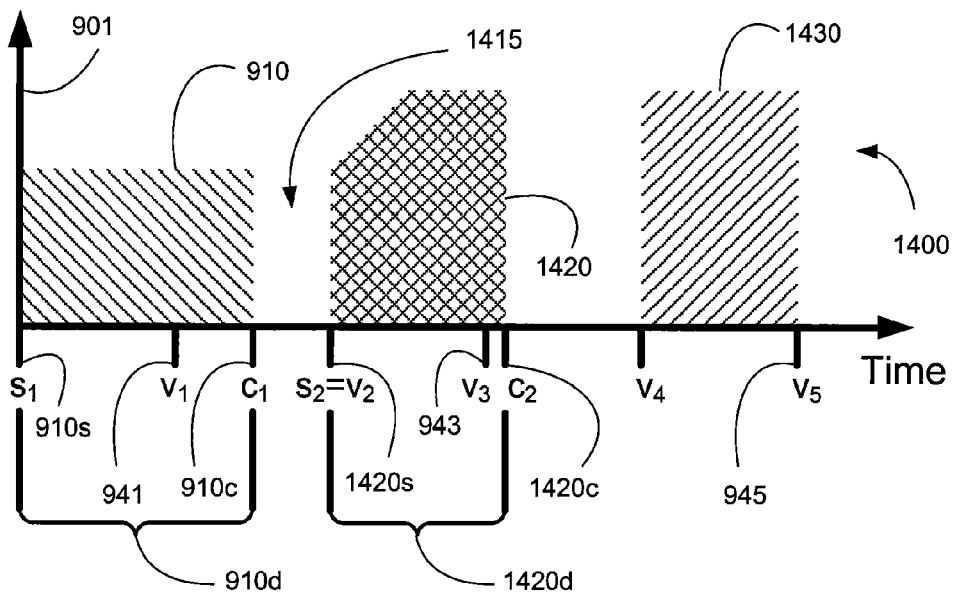
Figure 14:
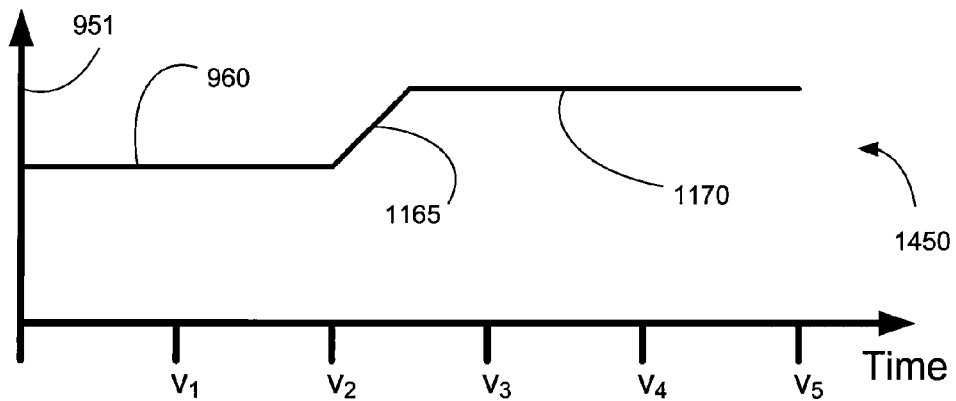

FIGS. 13 and 14 show timing diagrams that depict possible energy-consumption scenarios under an approach to monitoring and adjusting performance according to the scheme outlined in reference to FIGS. 3 and 4 and detailed, in various embodiments, in reference to FIGS. 5 through 7.

FIG. 13 illustrates that the methods disclosed herein avoid the counterproductive behaviours of a classic DFVS algorithm and of a Samson-inspired DVFS algorithm as illustrated in FIGS. 10 and 12. The frequency graph in lower view 1350 begins at frequency 960 and the sequence of tasks in upper view 1300 begins with task 1010; both beginnings are identical to those in FIGS. 10 and 12. Unlike in FIG. 10, method 300 does not focus on idle period 1315 of duration 1015$i$. Unlike in FIG. 12, method 300 does not focus on the amount 941m (or associated percentage) by which completion 1010$c$ of task 1010 missed Vsync $V_1$941. Instead, method 300 notes that time duration 1010$d$ of task 1010, computed by subtracting the task's starting time-point $S_1$ 1010$s$ from its completion time-point $C_1$ 1010$c$, does not exceed the time increment between two consecutive Vsync events. Therefore, despite a conventional indication of idle period 1315, DVFS module 150 determines at step 382C of FIG. 7 that the operating frequency of processor 110 should not be reduced. Once task 1320 begins "on time" at the next Vsync event, namely, $V_2$ 942, task 1320 and subsequent tasks 1330 and 1340 all meet their intended deadlines at Vsync events $V_3$ 943, $V_4$ 944, and $V_5$ 945, respectively. Frequency 960 was already optimal, and method 300 does not ruin a good thing, as the classic DVFS algorithm does in FIG. 10. Nor does it bring the frequency up to an unnecessarily high level, only to return the frequency to its rightful level, as the grinchesque algorithm of FIG. 12 does when it realizes its error.

FIG. 14 illustrates that method 300 correctly scales up in exactly same way as the Samson-inspired DVFS algorithm does in FIG. 11—the frequency graph in lower view 1450 is identical to the frequency graph in FIG. 11—but for a different reason. Rather than focusing on the amount 941m (or associated percentage) by which completion 910$c$ of task 910 missed Vsync $V_1$941, method 300 notes that time duration

910d of task 910, computed by subtracting the task's starting time-point $S_1$ 910s from its completion time-point $C_1$ 910c, exceeds the time increment between two consecutive Vsync events. It is for that reason that, at step 382C of FIG. 7, DVFS module 150 instigates transition 1165 to increased frequency 1170. Due to the non-instantaneous nature of scale-up 1165, task 1420 barely misses it intended deadline, namely Vsync event $V_3$ 943. Again, the small number of choices for an operating point of processor 110 generally precludes perfectionism when choosing the operating point. However, an application that consistently barely misses every deadline is effectively as tardy as one that takes nearly twice as long. So it is important that a DVFS algorithm based on task duration understand when a near miss is due to a non-instantaneous scale-up; this can be done by making the DFVS algorithm more sophisticated, so that it takes into consideration whether a scale-up just occurred.

Figure 8:
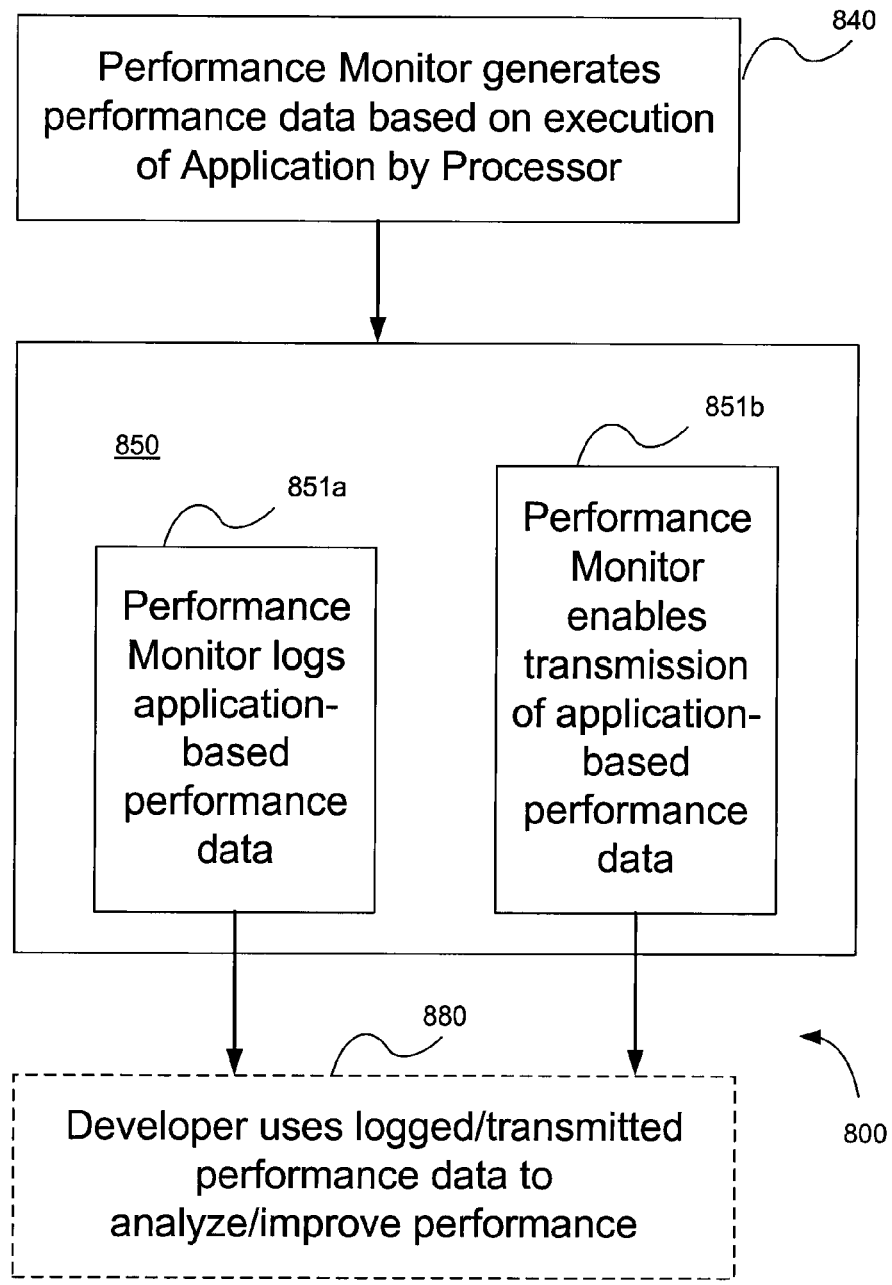
FIG. 8 shows a flowchart depicting an alternative to the method depicted in FIG. 3, in which method the results of performance monitoring are used for diagnostic purposes rather than for dynamically adjusting performance.

Turning finally to FIG. 8, a flowchart depicts an alternative to method 300 depicted in FIG. 3. In method 800, the results of performance monitoring are used for diagnostic purposes rather than for dynamically adjusting performance. As in step 340 of FIG. 3, at step 840, a performance monitor (such as windowing system 170) generates application-based performance data 153. Instead of progressing next to step 360 as in FIG. 3, control now passes to step 850. At this step, the performance monitor (or other module of device 100A) performs either or both of steps 851a and 851b. At step 851a, application-based performance data 153 is logged, i.e., stored in memory 120 in some fashion for retrieval by some means at a later time. Retrieval may involve removal of removable memory. Alternatively, special queries or commands may be sent to device 100A to allow external access to at least part of the logged data. At step 851b, performance monitor (or other module of device 100A) enables transmission of application-based performance data 153 from device 100A. This could involve preparing a message (in the broadest sense of the word), which can then be transmitted by means of an email application resident on device 100A, by means of a near-field communication (NFC), Wi-Fi™, or Bluetooth connection, by means of a (perhaps temporary) physical connection—such as a Universal Serial Bus (USB) connection—to another device, and/or by any other means for communicating data from device 100A in a targeted or broadcast manner.

The purpose of step 850 is to allow eventual human analysis of the logged and/or transmitted data at step 880. This could be done, for instance, with the intent of improving the performance device 100A based on the data, perhaps during a development phase, before device 100A has its hardware and supplied software finalized for commercial distribution of device 100A. For example, logged/transmitted application-based performance data might be assessed as indicating that application 140 was executing too slowly for a desired operating frequency of processor 110, and therefore its execution logic needed to be streamlined.

Certain adaptations and modifications of the described embodiments can be made. Therefore, the above discussed embodiments are considered to be illustrative and not restrictive. In particular, the novel functionality that has been ascribed to application 140, a performance monitor (such as windowing system 170), and DVFS module 150 can be distributed in various ways. For example, it has already been noted that computation of a time increment could be accomplished by either application 140 or windowing system 170. Many such variations are possible, while still remaining within the scope of the attached claims. For instance, the additional code needed to implement the novel functionality generally ascribed herein to windowing system 170 could be inserted in another software module, even DFVS module 150.

Thus, the novel methods of monitoring and adjusting performance of device 100A could, in the extreme, be accomplished by DFVS module 150 obtaining application-based performance data 153 directly from application 140, bypassing windowing system 170 entirely. Furthermore, is well known that configuring a computing device to have certain functionality can be variously accomplished by software, firmware, and/or hardware.

We claim:

1. A method for managing energy consumption of a mobile computing device by means of a Dynamic Voltage/Frequency Scaling (DVFS) module of the device, the method comprising:
   the DVFS module obtaining generated application-based performance data related to execution of an application by a processor of the device, the application-based performance data generated by:
   obtaining temporal data from the application including at least one of a time-point at which the application started performing a task and a time-point at which the application completed performing the task,
   computing a time increment related to the application's performance of the task, based on the temporal data,
   comparing the computed time increment to a target time increment, and
   at least one of: generating a flag based on whether the computed time increment exceeds the target time increment and incrementing a running count of occasions when the computed time increment exceeds the target time increment; and
   the DVFS module determining an operating point of the processor based on the performance data.

2. The method of claim 1, wherein the generating the application-based performance data is based on the application's performance of a task related to rendering an image for presentation on a display unit of the device.

3. The method of claim 1, wherein the application-based performance data comprises the computed time increment.

4. The method of claim 3, wherein determining an operating point comprises comparing the computed time increment to the target time increment.

5. The method of claim 1, wherein the target time increment is based on a time increment between two Vertical Synchronization (Vsync) events.

6. The method of claim 5, wherein the two Vsync events are consecutive Vsync events.

7. The method of claim 5, wherein the target increment equals the time increment between the two Vsync events.

8. The method of claim 1, wherein determining an operating point comprises determining an operating point that maintains or increases the operating frequency of the processor if the computed time increment exceeds the target time increment.

9. The method of claim 2, wherein the application comprises a graphics application that contributes to rendering of one or more images on a display unit of the device, wherein generating the application-based performance data is performed by a windowing system of the device, and wherein the DVFS module obtaining said data comprises obtaining said data from the windowing system.

10. The method of claim 1, further comprising: the DVFS module obtaining application-agnostic performance data indicating the processor is idle; and wherein determining an operating point comprises determining an operating point that maintains or increases the frequency of the processor, based on the application-based performance data, even though the processor is idle.

11. The method of claim 1, wherein the DVFS module obtaining application-based performance data comprises obtaining said data directly from the application.

12. A computing device comprising:
one or more processors; and
a memory connected to the one or more processors and containing:
processor-executable instructions for an application, for execution on a corresponding processor of the one or more processors; and
processor-executable instructions for a Dynamic Voltage/Frequency Scaling (DVFS) module that, when executed, cause the DVFS module to:
obtain application-based performance data related to execution of the application on the corresponding processor;
obtain application-agnostic performance data;
detect whether the corresponding processor is idle, based on the application-agnostic performance data; and
determine an operating point of said processor that maintains or increases the operating frequency of said processor, based on the application-based performance data, even if said processor is detected to be idle,
wherein the memory further contains processor-executable instructions for a windowing system, and wherein the instructions that cause the DVFS module to obtain the application-based performance data cause the DVFS module to obtain said data from the windowing system by obtaining temporal data from the application including at least one of a time-point at which the application started performing a task and a time-point at which the application completed performing the task.

13. The computing device of claim 12, further comprising a display unit, and wherein the instructions for the windowing system, when executed, cause the windowing system to generate the application-based performance data based on a time increment related to the application's performance of a task related to rendering an image for presentation on the display unit.

14. The computing device of claim 13, wherein the instructions that, when executed, cause the windowing system to generate the application-based performance data cause the windowing system to compare the computed time increment to a target time increment.

15. The computing device of claim 12, wherein the instructions that cause the DVFS module to determine an operating point of the corresponding processor cause the DVFS module to: determine an operating point that maintains or increases the operating frequency of said processor if the time increment exceeds the target time increment.

16. A non-transitory, processor-readable storage medium storing processor-executable instructions that, when executed by a computing device, perform the method of claim 1.

* * * * *